Oct. 27, 1970  C. I. BOKSJO  3,536,938
BOOSTER VOLTAGE CIRCUIT FOR SERIES-CONNECTED THYRISTORS
Filed Aug. 14, 1967
FIG.1 PRIOR ART
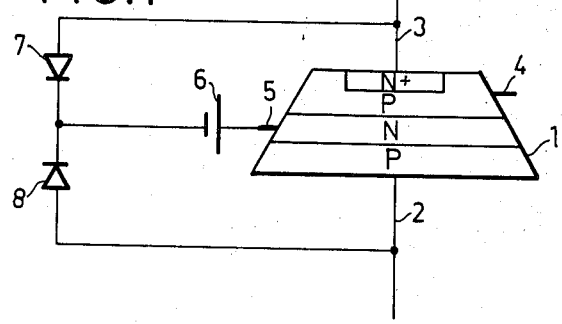
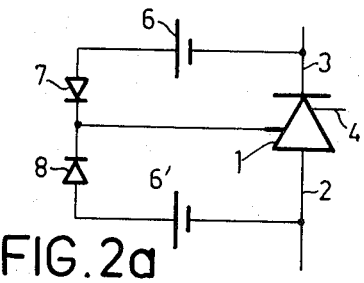
FIG.2a
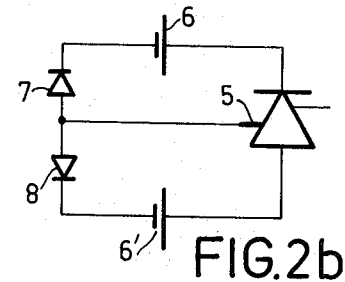
FIG.2b
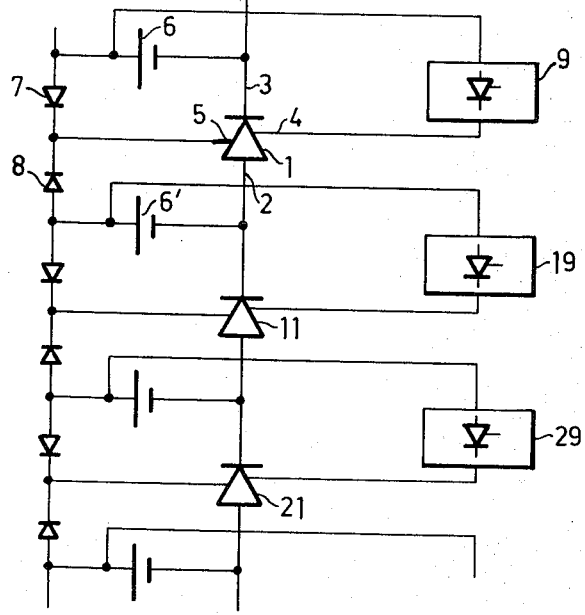
FIG.3
INVENTOR.
CARL INGVAR BOKSJO
BY
Jennings Bailey, Jr United States Patent Office 3,536,938
Patented Oct. 27, 1970

3,536,938
BOOSTER VOLTAGE CIRCUIT FOR SERIES-CONNECTED THYRISTORS
Carl Ingvar Boksjo, Ludvika, Sweden, assignor to Allmanna Svenska Elektriska Aktiebolaget, Vasteras, Sweden, a corporation of Sweden
Filed Aug. 14, 1967, Ser. No. 660,493
Claims priority, application Sweden, Sept. 5, 1966, 11,940/66
Int. Cl. H01l 11/10; H03k 17/56
U.S. Cl. 307—305                    8 Claims

ABSTRACT OF THE DISCLOSURE

In order to improve the performance of series connected thyristors these are provided with an individual electrode connected to a n-layer or a p-layer nearest the anode respectively the cathode of each thyristor. A separate DC voltage source supplies this electrode with a voltage, called booster voltage, and is connected in such a circuit that the source in the case of a chain of a number of series connected thyristors serves simultaneously two adjacent thyristors in the chain.

FIELD OF THE INVENTION

The present invention is concerned with a booster voltage circuit arrangement for series connected thyristors each having at least three pn-junctions between semiconductor layers of alternately opposite conductivity type, one booster voltage electrode in each thyristor being connected to one of the semiconductor layers positioned between the anode and the cathode, respectively, of the thyristor. As regards an npnp-thyristor, the booster voltage electrode is connected to the n-layer positioned most closely adjacent the anode, whilst the booster voltage electrode of a pnpn-type thyristor is connected to the p-layer positioned most closely adjacent the cathode.

BACKGROUND OF THE INVENTION

The prior art

Series connected npnp-type thyristors may be coupled according to earlier proposals resulting in that the characteristics of the thyristors are improved in various respects, such as blocking capacity after overcurrent, permissible operating temperature and electrical strength. In that case the thyristor is supplied with a so called booster voltage via the mentioned electrode, in order to affect the carriers of the conductive pn-junction such that they are not injected towards the barrier pn-junction. According to this proposal, the booster voltage electrode connected to the n-layer positioned most closely adjacent the anode is connected to one pole of an auxiliary voltage source in the form of, for example a capacitor supplied with direct current or a rectifier bridge, whereas the other pole of the current source is connected to the connection point between two diodes opposing one another, which diodes at their opposite ends are connected to one or the other of the main electrodes of the thyristor, that is the anode and the cathode, respectively, such a way that the negative pole of the auxiliary voltage source is constantly connected to the most positive main electrode. A corresponding connection is, of course, also possible with pnpn-type thyristors, in which case the diodes and the auxiliary voltage source have to be connected in such a way that the positive pole of the auxiliary voltage source is constantly connected to the most negative main electrode. These known connections involve among other things the disadvantage that it is difficult to produce the booster voltage at the proposed potential level, and are, therefore, complicated from a viewpoint of circuitry.

Summary of the invention

By the circuit arrangement according to the present invention these disadvantages are eliminated due to the fact that the anode and the cathode of each thyristor are connected to one pole each of an auxiliary voltage source, the two other poles of which are joined by two diodes, opposing one another, whose common junction is connected to the booster voltage electrode.

According to a further development of the invention the auxiliary voltage source of any suitable construction may produce a voltage including transients, provided that the conditions as to polarity during the critical operation periods of the thyristor are fulfilled.

If control devices are provided to be supplied with an auxiliary voltage, it is, as a consequence of this dividing of the auxiliary voltage source, possible to combine the auxiliary voltage source with its own control device and with the control device for the series connected thyristor in the chain. Thus, with thyristor connected next in series, two thyristors may be served by each auxiliary voltage source, in such a way that one thyristor e.g. is supplied with a booster voltage, while the control electrode of the adjacent thyristor receives control pulses during the ignition period through its control device.

In the following examples there is, actually, at least one control device comprised, which, however, in view of the invention is not necessary for, ignition of the thyristor, since this may be accomplished according to other known principles.

BRIEF DESCRIPTION OF THE DRAWINGS

The invention will now be described in detail with reference to embodiments to be exemplified in the drawing in which FIG. 1 shows a known circuit arrangement with an npnp-thyristor, FIG. 2a a corresponding circuit according to the invention, FIG. 2b a circuit corresponding to FIG. 2a but with a pnpn-thyristor, and FIG. 3 a circuit including three npnp type thyristors connected in series.

DESCRIPTION OF THE PREFERRED EMBODIMENTS

FIG. 1 is a schematic sectional view of an npnp-thyristor 1 having three pn-junctions between the semiconductor layers n and p of alternatingly opposite conductivity types. On the p-layer closest to the main electrode 3 of cathode of the thyristor a control electrode 4 is provided, while a booster voltage electrode 5 is arranged on the n-layer closest to the main electrode 2 or anode of the thyristor. The control electrode 4 may be connected in a conventional manner to a control device, not shown. The booster voltage electrode 5 is connected to one pole of an auxiliary voltage source 6, here in the form of a DC voltage element. Between the cathode 3 and the anode 2 two diodes 7, 8 opposing one another are inserted, whose point of connection is joined to the other pole of the voltage source 6.

This circuit is characterized by the following features, which are necessary for proper booster voltage operation.

(1) With positive voltage on anode 2 relative cathode 3, a barrier voltage across the thyristor, the booster voltage electrode will assume the potential of the anode augmented by a fixed positive voltage $\Delta U$. If the potential of the anode is equal to 0 and that of the cathode $-U$, the booster voltage electrode will have a potential of $0 + U$.

(2) At negative voltage on anode 2 relative to cathode 3, a blocking voltage across the thyristor, the booster voltage electrode will assume the potential of the cathode, augmented by a fixed positive voltage $\Delta U$. If the potential of the anode still is assumed to be equal to 0 and that of the cathode $+U$, the booster voltage electrode will have a potential of $U+\Delta U$.

In order to attain a corresponding result with a circuit having pnpn type thyristors, the poles of the two diodes 7, 8 and the auxiliary voltage source 6 have to reversed, which results in the booster voltage electrode at off-state voltage across the thyristor assuming a negative voltage $\Delta U$ relative to the cathode and, at blocking voltage, a negative voltage relative to the anode.

Since the auxiliary voltage usually represents a small fraction only of the thyristor voltage, the latter voltage will mainly determine the electric strength of the auxiliary diodes. With regard to transients, the recombination period of the diodes should be brief. In practice, it may, therefore, be advisable that each diode branch comprises 4–5 diodes for lower voltage, possibly in combination with a voltage divider.

The circuit according to the invention and shown in FIGS. 2a and 2b is less complicated to accomplish in practice than that according to FIG. 1, but it provides the same booster voltage effect as the circuit shown in FIG. 1. The new circuit is characterized primarily in the fact that the auxiliary voltage source 6 shown in FIG. 1 now is substituted by two separate voltage sources 6 and 6', one pole of the voltage source 6 being connected to the cathode 3 of the thyristor 1, and the equivalent pole of voltage source 6' to the anode 2. The other poles of the voltage sources are connected to the respective electrodes of associated diodes 7, 8, which are opposed to one another and whose other electrodes are connected to each other and commonly joined to the booster voltage electrode 5 of the thyristor.

In the case of the npnp-thyristor the diodes and the auxiliary voltage source are connected in such manner that the characteristics in accordance with items (1) and (2) above are ensured, that is such that the minus pole of the auxiliary voltage source always is connected to the most positive main electrode 2 or 3 of the thyristor 1. In a pnpn type thyristor the plus pole of the auxiliary voltage source always has to be connected to the most negative main electrode 2 or 3.

The booster voltage circuit arrangement shown in FIG. 3 comprises three thyristors connected in series, viz. 1, 11, and 21, each being connected to its respective control device 9, 19 and 29, for the ignition pulses. The control device contains, in the present case, a thyristor switching circuit to deliver the ignition pulses at a proper time and at a suitable control angle, respectively. The thyristor 1 in the upper circuit in FIG. 3 with the diodes 7, 8 is comprised in a complete circuit shown in FIG. 2, while the equivalent circuits connected in series therewith and their respective thyristors 11 and 21 have one of the auxiliary voltage sources in common with the adjacent thyristor circuit.

Thus, with series connection, two thyristors, such as 1 and 11, can be served from the same auxiliary voltage source, in the present case source 6', resulting in making the arrangement simpler, and accordingly, cheaper in manufacture.

What I claim is:

1. A booster voltage circuit arrangement comprising series connected thyristors each having an anode and a cathode and at least three pn-junctions between semiconductor layers of alternately opposite conductivity type and at least one booster electrode in each thyristor connected to one of the semiconductor layers positioned between the anode and the cathode, respectively, of the thyristor, auxiliary voltage source means for supplying auxiliary voltage, means connecting the anode and the cathode of each thyristor to one pole each of said auxiliary voltage source means of the same polarity, means comprising two diodes, opposing one another, connecting the other poles of the auxiliary voltage source means to each other and having a common junction, and means connecting the common junction of the two diodes to the booster voltage electrode.

2. A circuit arrangement according to claim 1, each thyristor being of npnp-type, said booster voltage electrode being connected to the n-layer positioned most closely adjacent the anode.

3. A circuit arrangement according to claim 2, the connecting means including means connecting the diodes and the auxiliary voltage source to keep the negative pole of said source connected to the most positive of the anode and cathode of the thyristors.

4. A circuit arrangement according to claim 1, each thyristor being of pnpn-type, said booster voltage electrode being connected to the p-layer positioned most closely adjacent the cathode.

5. A circuit arrangement according to claim 4, the connecting means including means connecting the diodes and the auxiliary voltage source to keep the positive pole of said source constantly connected to the more negative of the anode and the cathode of the thyristors.

6. A circuit arrangement according to claim 1, each thyristor including a control electrode, an energy source, a control device connected to the energy source and to the control electrode to supply ignition pulses thereto, said energy source comprising an auxiliary voltage source constituting a part of said auxiliary voltage source means, and means to supply the control electrode of the next thyristor in the chain of series connected thyristors through its associated control device from the auxiliary voltage source that is connected most closely adjacent this thyristor and is connected with the preceding thyristor in the chain.

7. A circuit arrangement according to claim 6, said supply means supplying a portion only of the voltage of the auxiliary voltage source to said control device.

8. A circuit arrangement according to claim 1, the auxiliary voltage source means including means to provide an auxiliary output voltage containing transients.

References Cited

UNITED STATES PATENTS

| 3,444,398 | 5/1969 | Brockway | 307—305 |
| 3,267,290 | 8/1966 | Diebold | 307—284 XR |

FOREIGN PATENTS

| 1,298,103 | 5/1962 | France. |
| 1,348,735 | 12/1963 | France. |

STANLEY T. KRAWCZEWICZ, Primary Examiner

U.S. Cl. X.R.

307—284